W. F. SHERMAN.
Vessel for Holding Liquids.
No. 199,231. Patented Jan. 15, 1878.
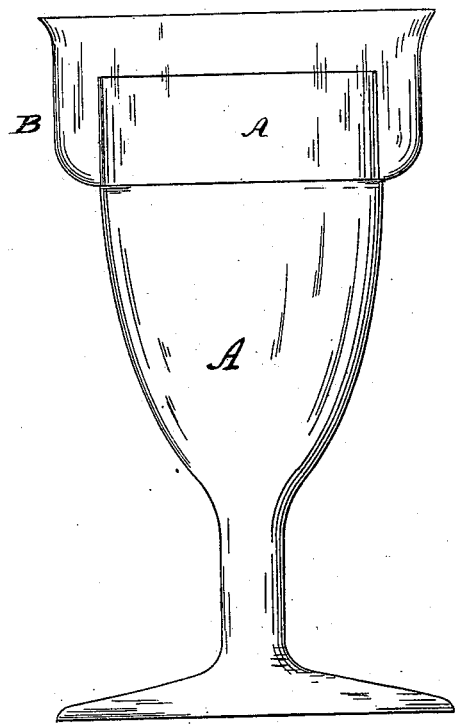

UNITED STATES PATENT OFFICE.

WILLIAM F. SHERMAN, OF LOWELL, MASSACHUSETTS.

IMPROVEMENT IN VESSELS FOR HOLDING LIQUIDS.

Specification forming part of Letters Patent No. 199,231, dated January 15, 1878; application filed August 17, 1877.

*To all whom it may concern:*

Be it known that I, WILLIAM FRANCIS SHERMAN, of Lowell, in the county of Essex and State of Massachusetts, have invented a certain new and useful Improvement in Vessels for Holding Liquids, which improvement is fully set forth in the following specification, reference being had to the accompanying drawing, making a part hereof.

My improvement is designed to obviate all inconvenience arising from the overflow of liquids; and it consists in the combination, with any ordinary vessel, of a reservoir formed outside the edge of the vessel, and having a rim of equal height with, or higher than, the rim of the vessel. By this means all overflow is caught, and not wasted.

In the drawing, A represents the vessel, around the upper part of which is shown the reservoir B. The reservoir is of such a shape and of such a height, when compared with the rim of the vessel, that when tipped for the purpose of pouring out the liquid all the liquid in the vessel and whatever has overflowed into the reservoir will be emptied at the same time.

My invention is particularly adapted for drinking-cups for soda-water, lager beer, and other effervescent liquids, as the overflow will not be lost, but will be caught in the reservoir, and the person drinking will drink from the rim of the reservoir, the liquid flowing from the vessel into the reservoir. For this reason I prefer to make the rim of the reservoir higher than the rim of the vessel, though it may be made of the same height and still answer well.

The vessel A is shown in the drawing with a stem and round flat base; but this, of course, will vary with the purpose for which the vessel is to be used.

For flower-vases the material and design may be such as are now common. For beer and soda-water I commonly use glass, and make them much the same shape, except the addition of the reservoir B, as those now used.

What I claim as my invention is—

The vessel A, in combination with the reservoir B, the rims of the two being arranged in relation to each other, as described.

WILLIAM F. SHERMAN.

Witnesses:
J. E. MAYNADIER,
GEORGE O. G. COALE.